United States Patent
Wien

(10) Patent No.: US 12,193,353 B2
(45) Date of Patent: Jan. 14, 2025

(54) PNEUMATIC DISTRIBUTION MACHINE

(71) Applicant: Amazonen-Werke H. Dreyer SE & Co. KG, Hasbergen (DE)

(72) Inventor: Thomas Wien, Stuhr (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 211 days.

(21) Appl. No.: 17/909,433

(22) PCT Filed: Apr. 1, 2021

(86) PCT No.: PCT/EP2021/058633
§ 371 (c)(1),
(2) Date: Sep. 5, 2022

(87) PCT Pub. No.: WO2021/204677
PCT Pub. Date: Oct. 14, 2021

(65) Prior Publication Data
US 2023/0133821 A1    May 4, 2023

(30) Foreign Application Priority Data
Apr. 8, 2020   (DE) ............... 10 2020 109 791.3

(51) Int. Cl.
*A01C 7/08*   (2006.01)
(52) U.S. Cl.
CPC .................. *A01C 7/084* (2013.01)
(58) Field of Classification Search
None
See application file for complete search history.

(56) References Cited

U.S. PATENT DOCUMENTS

| | | | |
|---|---|---|---|
| 10,779,460 B2 * | 9/2020 | Pirkenseer | A01C 7/084 |
| 2007/0181048 A1 * | 8/2007 | Pleyer | A01C 7/042 |
| | | | 111/175 |
| 2023/0109764 A1 * | 4/2023 | Asche | A01C 7/084 |
| | | | 239/8 |

FOREIGN PATENT DOCUMENTS

| | | |
|---|---|---|
| DE | 102015116378 A1 | 3/2017 |
| DE | 102016218531 A1 | 3/2018 |

(Continued)

OTHER PUBLICATIONS

Office Action in Canadian Patent Application 3,166,482 dated Oct. 10, 2023 issued by the Canadian Intellectual Property Office, includes one page Examination Search Report, 3 pgs, in English.

(Continued)

*Primary Examiner* — Joseph A Dillon, Jr.
(74) *Attorney, Agent, or Firm* — Hassan Abbas Shakir; SHAKIR LAW PLLC

(57) ABSTRACT

A pneumatic distribution machine for granular material includes a storage container, a delivery fan for generating a main air/material flow, and a distributor head configured to divide the main air/material flow fed to the distributor head into multiple individual air/material flows, a long main delivery line connecting the delivery fan, the storage container, and the distributor head, and a return device that includes a movable deflection element that is configured, in a dispensing position, to feed an individual air/material flow flowing into and inflow region of the return device to a dispensing region, connected to a dispensing line, of the return device, and in a shut-off position, to feed an individual air/material flow flowing into the inflow region of the return device to a return region that is connected to a return line of the return device.

17 Claims, 3 Drawing Sheets

(56) References Cited

FOREIGN PATENT DOCUMENTS

Figure 1:
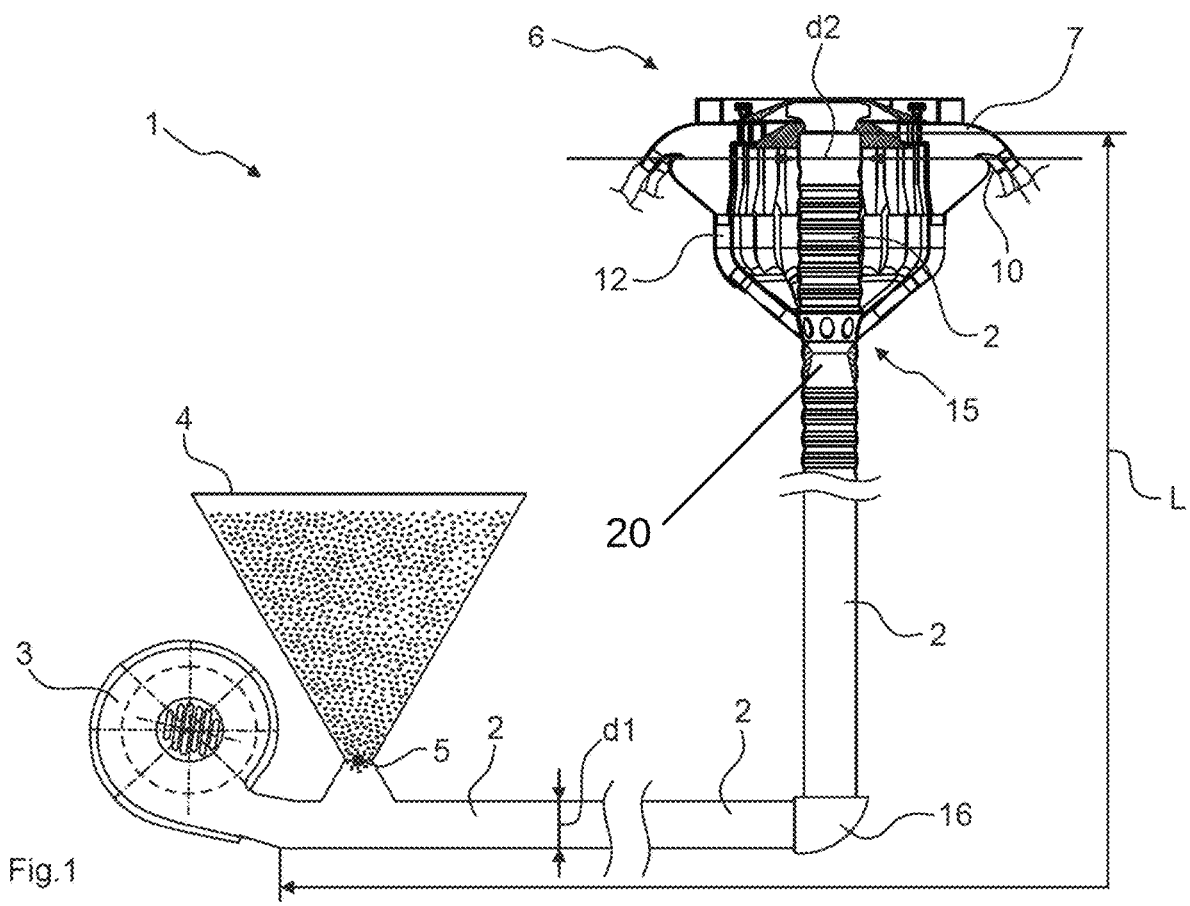

| EP | 642 729 A1 | 3/1995 |
| EP | 0799560 A2 | 10/1997 |
| EP | 3 372 065 A1 | 9/2018 |
| EP | 3520592 A1 | 8/2019 |
| EP | 3 698 614 A1 | 8/2020 |

OTHER PUBLICATIONS

Translation of Written Opinion of the International Searching Authority for related PCT patent application PCT/EP2021/058633 dated Jul. 5, 2021 prepared by the European Patent Office, 6 pgs., in English.
International Search Report for related patent application PCT/EP2021/058633 prepared by the European Patent Office and mailed Jul. 5, 2021, English translation provided.
Written Opinion of the International Searching Authority for related patent application PCT/EP2021/058633 prepared by the European Patent Office and mailed Jul. 5, 2021, English translation provided.
Search Report for related German Patent Application DE 10 2020 109 791.3 prepared by the German Patent & Trademark Office and mailed Feb. 17, 2021, partial machine translation provided.
Office Action for related Eurasian patent application 202292832 dated Jan. 24, 2023 and issued by the Eurasia in Patent Office, translation provided, references previously cited.

\* cited by examiner

PNEUMATIC DISTRIBUTION MACHINE

CROSS-REFERENCE TO RELATED APPLICATIONS

This application is a national stage under 35 U.S.C. § 371 of PCT patent application PCT/EP2021/058633 filed on 1 Apr. 2021, which is pending and which is hereby incorporated by reference in its entirety for all purposes. PCT/EP2021/058633 claims priority to German Patent Application DE 10 2020 109 791.3 filed on 8 Apr. 2020, which is hereby incorporated by reference in its entirety for all purposes.

BACKGROUND OF THE INVENTION

1. Field of the Invention

The invention relates to a pneumatic distribution machine for granular material used in agriculture. More particularly, the pneumatic distribution machine for granular material includes a return device that has a bypass line that connects the return region of the return device and the dispensing region of the return device.

2. Discussion of the Related Art

A distribution machine of this type is described in EP 642 729 A1. The distribution machine may be designed as a drilling machine or single-grain sowing machine, and is used for distributing granular material such as seed and/or fertilizer over a plurality of adjacently situated dispensing devices such as soil cultivation tools. This distribution machine has single row switching, which allows the dispensing at individual dispensing devices to be interrupted.

To make the single row switching possible, the distribution machine includes a distributor head that is configured to divide a main air/material flow, fed to it from a storage container by means of a delivery fan, into multiple individual air/material flows. From the distributor head, the individual air/material flow passes into a return device, or alternatively, directly into a dispensing line that transports the granular material to one of the dispensing devices. The number of return devices corresponds to the number of dispensing devices at which the dispensing may be interrupted.

The return device includes a deflection element that is configured, in a dispensing position, to feed an individual air/material flow flowing into an inflow region of the return device to a dispensing region, connected to a dispensing line, of the return device, and in a shut-off position, to feed an individual air/material flow flowing into the inflow region of the return device to a return region that is connected to a return line of the return device. The material that is not consumed thus passes back into the main delivery line via the return line, and is once again available for dispensing.

In one embodiment of this distribution machine, the delivery fan and the storage container are situated at the front end of a tractor while the distributor head and the dispensing devices are situated at the rear end, so that a main delivery line that connects the delivery fan, the storage container, and in particular the metering device, and the distributor head is particularly long, and in particular has a length of several meters. The main delivery line thus extends between the delivery fan and the distributor head, in particular over a distance of at least 8 meters. In addition, towed distribution machines are known in which a particularly long main delivery line having a length of at least 4 meters is routinely necessary between the delivery fan, situated near the storage container, and the dispensing devices or the distributor head, due to the fact that the storage containers have a long extension in the travel direction, and the distributor head is situated near the dispensing devices, behind and/or to the side of same. However, such long main delivery lines frequently have the problem that over their length, friction that develops at the line walls creates significant pressure loss. This energy is thus not available to the main air/material flow for conveying the material, resulting in a reduced conveying speed. It is particularly problematic that when there is reduced conveying speed, deposits of the granular material may form in the main delivery line, which triggers so-called transport surges; i.e., portions of the material deposited in the main delivery line are entrained by the main air/material flow, resulting in volume fluctuations during distribution of the granular material by the dispensing devices, and thus causing nonuniform dispensing.

A further problem with the distribution machine disclosed in EP 642 729 A1 is that deflection elements of the return devices in the shut-off position create an additional pressure loss. In this case the individual air/material flow cannot escape, and in addition to the main air/material flow is fed back into the main delivery line, resulting in undesirable back pressure. With an increasing number of dispensing devices whose dispensing is interrupted, i.e., return devices whose deflection elements are in the shut off position, the pressure loss in the main delivery line thus further increases. If the pressure loss exceeds, or if the conveying speed falls below, a critical threshold, the main air/material flow may collapse.

To mitigate these problems, the distribution machine described above provides supply air nozzles at which, due to a cross-sectional constriction of the main delivery line, a suction effect is to develop at the supply air nozzle that is open to the surroundings, so that sufficient conveying air is available. However, the granular material that is conveyed in the main air/material flow is slowed down by the cross-sectional constriction, which counteracts the desired effect in that sufficient conveying air is provided at the expense of reduced conveying speed. Thus, the problems of decreasing conveying speed due to large pressure losses in long main delivery lines are not satisfactorily eliminated.

SUMMARY OF THE INVENTION

The object underlying the invention is thus to refine a distribution machine having a long main delivery line, and to avoid the disadvantages known in the prior art. In particular, the pressure loss in the main delivery line and/or at the distributor head is to be reduced.

This object is achieved according to the invention by a distribution machine having wherein a pneumatic distribution machine for granular material, including

- at least one storage container for the granular material;
- at least one delivery fan for generating a main air/material flow;
- at least one distributor head that is configured to divide the main air/material flow fed to the distributor head into multiple individual air/material flows;
- a long main delivery line that connects the delivery fan, the storage container, and the distributor head; and
- at least one return device that includes a movable deflection element that is configured, in a dispensing position, to feed an individual air/material flow flowing into an inflow region of the return device to a dispensing region, connected to a dispensing line, of the return device, and in a shut-off position, to feed an individual air/material flow flowing into the inflow region of the return device to a return region that is connected to a return line of the return device;
characterized in that the return device includes a bypass line that connects the return region of the return device and the dispensing region of the return device.

Advantageous refinements of the distribution machine according to the invention are the subject matter of the dependent subclaims.

According to the invention, it is provided that the return device includes a bypass line that connects the return region of the return device and the dispensing region of the return device. The invention makes use of the finding that, due to the pneumatic connection between the return region and the dispensing region, the back pressure that develops via a return device, whose deflection element in particular is in the shut-off position, is advantageously reduced. Excess conveying air from the main air/material flow that is fed to the distributor head is divertible via the bypass line, in particular via the dispensing line, preferably at the dispensing devices, so that the back pressure and thus the pressure loss in the main delivery line and at the distributor head are reduced.

In one advantageous refinement of the distribution machine according to the invention, it is provided that the long main delivery line has a cross section with a diameter through which flow passes, and a length through which flow passes, the ratio of length to diameter, i.e. length-to-diameter ratio, being at least 30. Tests have shown that the invention is particularly effective starting at a length-to-diameter ratio of 30. The greater the length-to-diameter ratio of the main delivery line, the more advantageous is the effect of the invention.

To further lower the back pressure in the main delivery line and at the distributor head, and thus to further reduce the pressure loss, in a further advantageous refinement of the invention the return line of the return device is connected to a feed region of the main delivery line, the main delivery line having a larger cross section between the feed region and the distributor head than upstream from the feed region in the flow direction. The main delivery line between the feed region and the distributor head is thus configured to convey an increased conveying air volume and/or volume of the main air/material flow. An increase in the conveyable flow volume reduces the risk of a measurable back pressure forming. In particular, it is provided that the main delivery line between the feed region and the distributor head has a larger diameter than in the region of a nozzle that is situated upstream from the feed region in the flow direction and integrated into the main delivery line. The action of the nozzle is thus advantageously improved. The nozzle may be exchangeable, so that its action in the main delivery line may be adjusted by selecting a nozzle having a suitable diameter.

In one advantageous refinement of the above embodiment of the distribution machine according to the invention, it is provided that the ratio of the length of the main delivery line to the larger diameter of the main delivery line between the feed region and the distributor head is at least 25.

In a further advantageous embodiment of the distribution machine according to the invention, the long main delivery line includes at least two, preferably at least three, flexible tube elements. By use of a flexible tube element, two portions of the main delivery line that are connected by the tube element are movable relative to one another, so that components of the distribution machine that are adjustable or foldable with respect to one another are connectable by means of the main delivery line. The delivery fan, the storage container, and the distributor head may be movably supported, so that as a result of this measure, the main delivery line is configured to connect these components of the distribution machine, in particular over a distance of several meters. Due to this measure, the distribution machine is configured to cover large working widths in the working position, and for transport on public roadways, to be limited to the allowable transport width by moving two components, connected via a flexible tube element, relative to one another.

In order to feed the main air/material flow to the distributor head with low pressure loss, the distribution machine according to the invention is also advantageously refined in such a way that the long main delivery line includes at least two elbow joints, preferably with at least a 90-degree curvature. The elbow joints may preferably achieve a 90-degree curvature, individually or collectively. It is conceivable in particular for both elbow joints to have a curvature of 45 degrees.

The distribution machine according to the invention is also advantageously refined by configuring the deflection element to close off the bypass line in the dispensing position. A leak of the individual air/material flow from the return device in the direction of the main delivery line is thus advantageously prevented. In addition, pressure loss thus does not occur in the main delivery line, since in the dispensing position of the deflection element, the main air/material flow cannot escape via the bypass.

In one particularly advantageous refinement of the distribution machine according to the invention, the deflection element is configured to open up the bypass line in the shut-off position. The bypass line in the shut-off position of the deflection element is thus opened, so that excess conveying air from the individual air/material flow may be separated, and the back pressure caused by the returned individual air/material flow is reduced.

To form the deflection element in a geometrically advantageous manner for its functions, in a further advantageous refinement of the distribution machine according to the invention it is provided that the deflection element is designed as a rocker with two rocker arms, the rocker arms in each case extending radially outwardly from a rotational axis of the deflection element.

The distribution machine according to the invention, in which the deflection element is designed as a rocker, is also advantageously refined by configuring a rocker arm of the deflection element to close off the bypass line of the return device in the dispensing position of the deflection element. Alternatively or additionally, a rocker arm of the deflection element is configured to close off a passage between the inflow region of the return device and the return region of the return device in the dispensing position of the deflection element. Alternatively or additionally, it is provided that at least one rocker arm of the deflection element is configured to close off a passage between the inflow region of the return device and the dispensing region of the return device in the shut-off position of the deflection element. The deflection element embodied as a rocker is thus advantageously provided with a dual function.

In a further advantageous refinement of the distribution machine according to the invention, it is provided that the main delivery line has a pressure resistance, the pressure resistance being at least one-third of the pressure difference that is generatable by the delivery fan. The pressure resistance of the main delivery line may result from the sum of the pressure resistances of its components between the delivery fan and the distributor head. Tests have shown that according to this refinement, the delivery fan is suitably coordinated with the main delivery line, and the invention is particularly effective starting at this ratio of pressure resistance to the pressure difference that is generatable by means of the delivery fan.

A further advantageous embodiment of the distribution machine according to the invention is characterized in that the distribution machine includes a number of return devices, the deflection elements of a first subset of the number of return devices being transferable between the dispensing position and the shut-off position, and the deflection elements of a second subset of the number of return devices, which in particular corresponds to the quantity of remaining return devices, being situated, preferably permanently, in the shut-off position. The distribution machine may include more return devices than dispensing devices. The deflection elements of the return devices that are connected to a dispensing device via a dispensing line are transferable between the dispensing position and the shut-off position. The deflection elements of the return devices that are not connected to a dispensing device may be permanently situated in the shut-off position, it being possible to connect the dispensing regions of these return devices to an exhaust air line. The subset of the return devices whose deflection element is in the shut-off position may thus be advantageously, preferably permanently, utilized for discharging excess conveying air. An increased volume of the main air/material flow is thus feedable to the distributor head.

BRIEF DESCRIPTION OF THE INVENTION

Figure 2A:
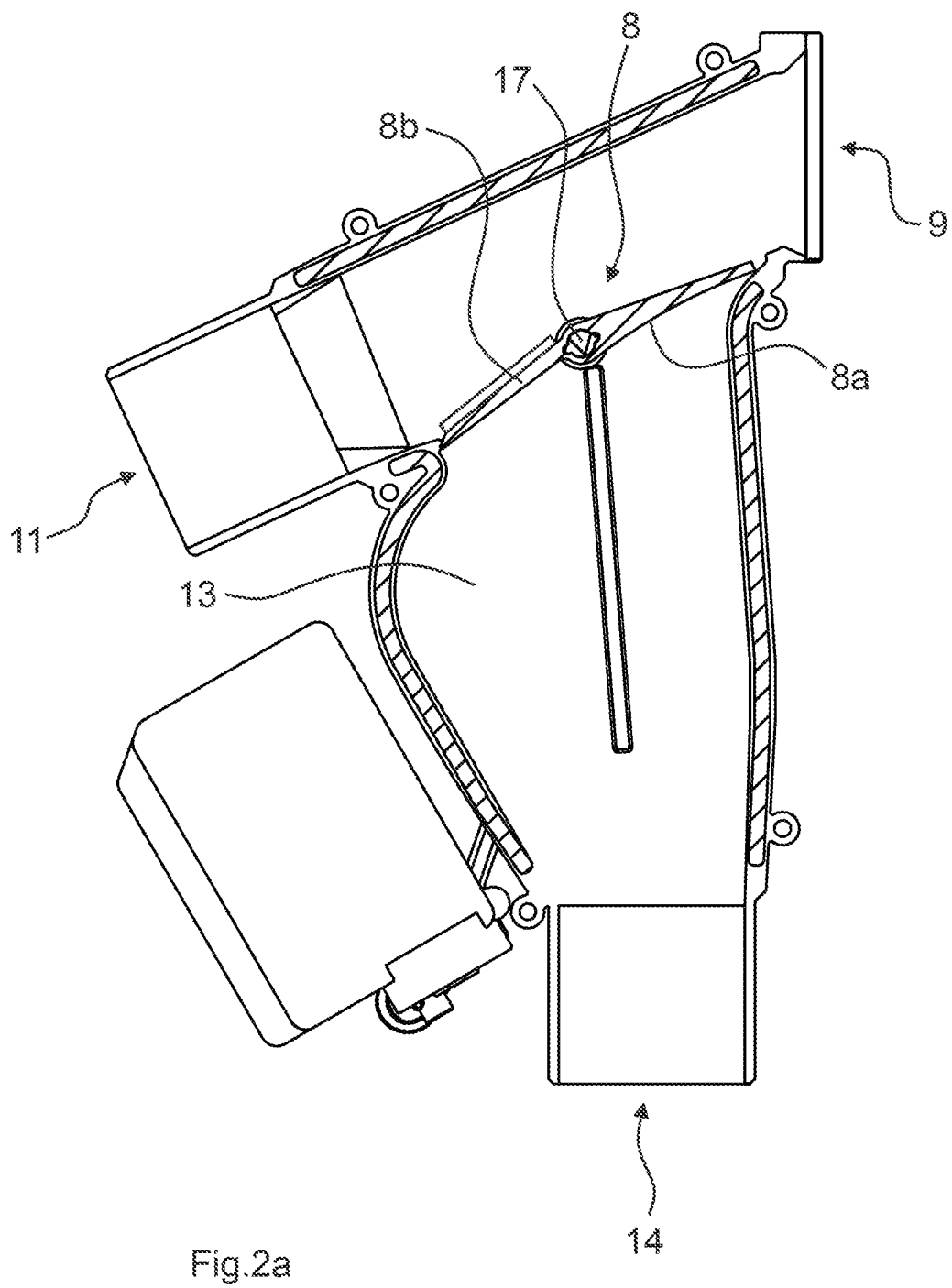
Figure 2B:
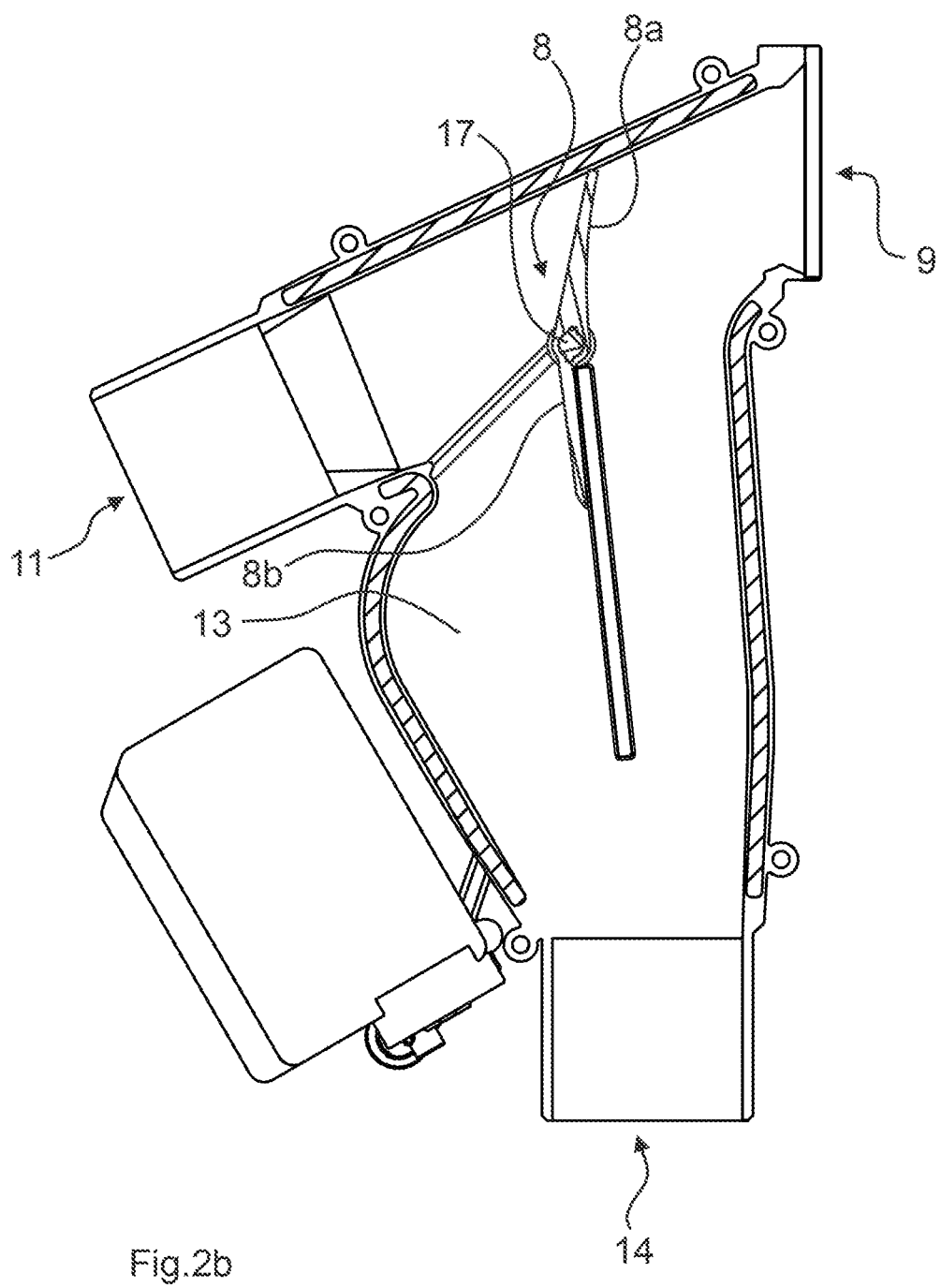

Further particulars of the invention are apparent from the description of the example and the drawings. In the drawings:

FIG. 1 shows a schematic illustration of a distribution machine according to the invention, including a distributor head that is provided with return devices, FIG. 2a shows a return device in the dispensing position, in a sectional view, and FIG. 2b shows the return device according to FIG. 2a in the shut-off position, in a sectional view.

DETAILED DESCRIPTION OF THE INVENTION

A distribution machine 1 according to the invention that includes a long main delivery line 2 is schematically illustrated in FIG. 1. The main delivery line 2 extends over several meters, in particular at least 4 meters, and connects a delivery fan 3, a storage container 4 for granular material, with which a metering device 5 for granular material is associated, and a distributor head 6 of the distribution machine 1. The metering device 5 is configured to dispense granular material such as seed and/or fertilizer from the storage container 4 into the main delivery line 2 in an adjustable quantity. The delivery fan 3 draws in air from the surroundings, compresses the air, and introduces it into the main delivery line 2, thus generating a main air/material flow. The delivery fan 3 is thus configured for generating a pressure difference between the surroundings and the main delivery line 2. The main air/material flow is supplied via the main delivery line 2 to the distributor head 6, which is configured to divide the supplied main air/material flow into multiple individual air/material flows.

Connected to the distributor head 6 are a plurality of return devices 7, in this case a total of 24 return devices, of which only 12 are visible due to the sectional view, and which in each case include a movable deflection element 8 that is configured, in a dispensing position as shown in FIG. 2a, to feed an individual air/material flow flowing into an inflow region 9 of the return device 7 to a dispensing region 11, connected to a dispensing line 10, of the return device 7, and in a shut-off position as shown FIG. 2b, to feed an individual air/material flow flowing into the inflow region 9 of the return device 7 to a return region 14 that is connected to a return line 12 of the return device 7. The return device 7 is configured, by use of a bypass line 13 that connects the return region 14 of the return device 7 and the dispensing region 11 of the return device 7, to reduce a back pressure in the distributor head 6 and the main delivery line 2, and thus to decrease the pressure loss in the main delivery line 2.

The main delivery line 2 extends between the delivery fan 3 and the distributor head 6 over a length L through which flow passes, and has a cross section having a diameter d1 through which flow passes. Since the main delivery line 2 extends at least over several meters, the ratio of the length L to the diameter d1 of the main delivery line 2 is at least 30. However, between a feed region 15 that is connected to the return lines 12 of the return devices 7, and the distributor head 6, the main delivery line 2 has a larger cross section, with a second diameter d2, than upstream from the feed region 15 in the flow direction. In this distribution machine 1, the ratio of the length L of the main delivery line 2 to the second, larger diameter d2 of the main delivery line 2 between the feed region 15 and the distributor head 6 is at least 25. Situated upstream from the feed region 15 in the flow direction is a nozzle 20 which is integrated into the main delivery line 2. The nozzle additionally speeds up the main air/material flow prior to entering the section of the main delivery line 2 having the second, larger diameter d2 between the feed region 15 and the distributor head 6.

Since the delivery fan 3 and the distributor head 6 are supported so as to be movable relative to one another, it is provided that the main delivery line 2 includes multiple flexible tube elements, not illustrated in greater detail. The tube elements flexibly connect two portions of the main delivery line 2 so that these portions are movable relative to one another. In addition, the main delivery line 2 includes at least two elbow joints 16, only one of which is shown in FIG. 1, for suitably feeding the main air/material flow to the distributor head 6. In the shown distribution machine 1, the elbow joint 16 has a curvature of 90 degrees. It is also conceivable to use two elbow joints 16, each having a curvature of 45 degrees. The main delivery line 2 thus has a pressure resistance that is at least one-third of the pressure difference that is generatable by the delivery fan 3.

FIGS. 2a, 2b respectively show a return device 7 in the dispensing position and in the shut-off position, in a sectional view. As shown in FIG. 2a, the deflection element 8 is configured to close off the bypass line 13 in the dispensing position. In contrast, in the shut-off position shown in FIG. 2b, the deflection element 8 is configured to open up the bypass line 13. For this purpose, the deflection element 8 is designed as a rocker with two rocker arms 8a, 8b. The rocker arms 8a, 8b extend radially outwardly from a rotational axis 17 of the deflection element 8.

The one rocker arm 8b is configured to close off the bypass line 13 of the return device 7 in the dispensing position of the deflection element 8 according to FIG. 2a. In contrast, the other rocker arm 8a is configured to close off a passage between the inflow region 9 of the return device 7 and the return region 14 of the return device 7 in the dispensing position of the deflection element 8, as shown in FIG. 2a, and to close off a passage between the inflow region 9 of the return device 7 and the dispensing region 11 of the return device 7 in the shut-off position of the deflection element 8 according to FIG. 2b.

In this distribution machine 1, a total of 24 return devices 7 are connected to the distributor head 6, of which, as explained above, only 12 are visible in the schematic illustration in FIG. 1 due to the sectional view of the distributor head 6 and the section of the main delivery line 2 that is connected to the distributor head 6. The deflection elements 8 of one subset of 18 of the 24 return devices 7 are transferable between the dispensing position according to FIG. 2a and the shut-off position according to FIG. 2b, so that single row switching is implementable at dispensing devices that are connected to the dispensing regions 11 of these return devices 7 via dispensing lines 10. The deflection elements 8 of a second subset, namely, the remaining 6 of the 24 return devices 7, are permanently situated in the shut-off position, so that sufficient opportunity for discharging excess conveying air is provided at all times.

LIST OF REFERENCE NUMERALS 1 distribution machine
2 main delivery line
3 delivery fan
4 storage container
metering device
6 distributor head
7 return device
8 deflection element
8a, 8b rocker arm
9 inflow region
dispensing line
11 dispensing region
12 return line
13 bypass line
14 return region
feed region
d1 diameter
L length
d2 second diameter
16 elbow joint
17 rotational axis

What is claimed is:

1. A pneumatic distribution machine for granular material, comprising:
   a storage container for storing the granular material;
   a delivery fan for generating a main air/material flow;
   a distributor head dividing the main air/material flow fed to the distributor head into multiple individual air/material flows;
   a long main delivery line connecting the delivery fan, the storage container, and the distributor head; and
   a return device comprising a movable deflection element that is configured, in a dispensing position, to feed an individual air/material flow flowing into an inflow region of the return device to a dispensing region, connected to a dispensing line of the return device, and in a shut-off position, to feed an individual air/material flow flowing into the inflow region of the return device to a return region that is connected to a return line of the return device;
   wherein the return device comprises a bypass line that connects the return region of the return device and the dispensing region of the return device,
   wherein the long main delivery line has a cross section with a diameter (d1) through which flow passes, and a length (L) through which flow passes, the ratio of length (L) to diameter (d1) of the main delivery line being at least 30 wherein the long main delivery line relative to the cross section reduces turbulence and cross-flows in the long main conveying line before reaching the distributor head.

2. The distribution machine according to claim 1, wherein the return line of the return device is connected to a feed region of the main delivery line, the main delivery line having a larger cross section, with a second diameter (d2), between the feed region and the distributor head than upstream from the feed region in the flow direction, and having a larger diameter than in the region of a nozzle that is situated upstream from the feed region in the flow direction and integrated into the main delivery line.

3. The distribution machine according to claim 2, wherein the ratio of the length (L) of the main delivery line to the larger diameter (d2) of the main delivery line between the feed region and the distributor head is at least 25.

4. The distribution machine according to a claim 2, wherein the long main delivery line includes at least two or three, flexible tube elements.

5. The distribution machine according to claim 1, wherein the long main delivery line includes at least two elbow joints with at least a 90-degree curvature.

6. The distribution machine according to claim 1, wherein the deflection element is configured to close off the bypass line in the dispensing position.

7. The distribution machine according to claim 6, wherein the deflection element is configured to open up the bypass line in the shut-off position.

8. The distribution machine according to claim 6, wherein the deflection element is designed as a rocker with two rocker arms, the rocker arms in each case extending radially outwardly from a rotational axis of the deflection element.

9. The distribution machine according to claim 8, wherein a rocker arm of the deflection element is configured to close off the bypass line of the return device in the dispensing position of the deflection element.

10. The distribution machine according to claim 1, wherein the distribution machine includes a number of return devices, the deflection elements of a first subset of the number of return devices being transferable between the dispensing position and the shut-off position, and the deflection elements of a second subset of the number of return devices, which corresponds to the quantity of remaining return devices, being situated in the shut-off position.

11. The distribution machine according to claim 7, wherein the deflection element is designed as a rocker with two rocker arms, the rocker arms in each case extending radially outwardly from a rotational axis of the deflection element.

12. The distribution machine according to claim 8, wherein a rocker arm of the deflection element is configured to close off a passage between the inflow region of the return device and the return region of the return device in the dispensing position of the deflection element.

13. The distribution machine according to claim 8, wherein at least one rocker arm of the deflection element is configured to close off a passage between the inflow region of the return device and the dispensing region of the return device in the shut-off position of the deflection element.

14. The distribution machine according to claim 11, wherein a rocker arm of the deflection element is configured to close off the bypass line of the return device in the dispensing position of the deflection element.

15. The distribution machine according to claim 11, wherein a rocker arm of the deflection element is configured to close off a passage between the inflow region of the return device and the return region of the return device in the dispensing position of the deflection element.

16. The distribution machine according to claim 11, wherein at least one rocker arm of the deflection element is configured to close off a passage between the inflow region of the return device and the dispensing region of the return device in the shut-off position of the deflection element.

17. The distribution machine according to claim 1, characterized in that the main delivery line has a pressure resistance, the pressure resistance being at least one-third of the pressure difference that is generatable by the delivery fan.

* * * * *